(12) United States Patent
Koehler et al.

(10) Patent No.: US 12,106,405 B2
(45) Date of Patent: Oct. 1, 2024

(54) IMAGING SYSTEM CONFIGURED TO GENERATE NON-SPECTRAL VOLUMETRIC IMAGE DATA FROM A KVP SWITCHING MULTI-ENERGY ACQUISITION

(71) Applicant: KONINKLIJKE PHILIPS N.V., Eindhoven (NL)

(72) Inventors: Thomas Koehler, Norderstedt (DE); Kevin Martin Brown, Chardon, OH (US); Roland Proksa, Neu Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 664 days.

(21) Appl. No.: 17/252,445

(22) PCT Filed: Jun. 24, 2019

(86) PCT No.: PCT/EP2019/066570
§ 371 (c)(1),
(2) Date: Dec. 15, 2020

(87) PCT Pub. No.: WO2020/002174
PCT Pub. Date: Jan. 2, 2020

(65) Prior Publication Data
US 2021/0272338 A1    Sep. 2, 2021

Related U.S. Application Data

(60) Provisional application No. 62/691,999, filed on Jun. 29, 2018.

(51) Int. Cl.
*G06T 11/00*    (2006.01)
(52) U.S. Cl.
CPC .......... *G06T 11/008* (2013.01); *G06T 11/005* (2013.01); *G06T 2210/41* (2013.01); *G06T 2211/408* (2013.01)

(58) Field of Classification Search
CPC . G06T 11/008; G06T 11/003; G06T 2210/41; G06T 2211/408;
(Continued)

(56) References Cited

U.S. PATENT DOCUMENTS 6,950,493 B2 * 9/2005 Besson ................. A61B 6/488
378/16
6,963,631 B2 * 11/2005 Brunnett ............. A61B 6/4021
378/19
(Continued)

FOREIGN PATENT DOCUMENTS

WO    WO2016147844 A1    9/2016
WO    WO-2017046141 A1 *  3/2017  ............... A61B 6/42
(Continued)

OTHER PUBLICATIONS

Lifeng Yu et al: "Dual-Energy CT-Based Monochromatic Imaging", American Journal of Roentgenology, vol. 199, No. 5_supplement, Nov. 1, 2012 (Nov. 1, 2012), pp. S9-S15, XP055392243, US, ISSN: 0361-803X, DOI: 10.2214/AJR.12.9121 (Year: 2012).*
(Continued)

*Primary Examiner* — Aaron W Carter
*Assistant Examiner* — Courtney Joan Nelson
(74) *Attorney, Agent, or Firm* — Larry Liberchuk

(57) ABSTRACT

A reconstruction system includes a decomposer (204) configured to decompose at least two sets of projection data generated via kVp switching between at least two radiation source voltages. Each set corresponds to a different one of the at least two radiation source voltages. The system further includes a spectral channel (206) configured to process the at least two sets of projection data and generate spectral image data. The system further includes a non-spectral channel (208) configured to process the at least two sets of
(Continued)

projection data and generate non-spectral image data for a predetermined reference kVp.

8 Claims, 4 Drawing Sheets

(58) Field of Classification Search
CPC . G06T 2207/10036; G06T 2207/10081; G06T 7/0012; G06T 11/005; A61B 6/032; A61B 6/482; G16H 30/40
See application file for complete search history.

(56) References Cited

U.S. PATENT DOCUMENTS

| | | | | |
|---|---|---|---|---|
| 8,363,779 | B2* | 1/2013 | Chandra | A61B 6/4035 378/98.12 |
| 9,316,601 | B2 | 4/2016 | Proksa | |
| 9,316,745 | B2 | 4/2016 | Noshi | |
| 9,324,142 | B2* | 4/2016 | Shechter | G06T 7/0012 |
| 9,597,042 | B2 | 3/2017 | Proksa | |
| 9,980,686 | B2* | 5/2018 | Proksa | G06T 11/003 |
| 10,736,590 | B2 | 8/2020 | Schafer | |
| 2017/0181714 | A1 | 6/2017 | Bippus | |

FOREIGN PATENT DOCUMENTS

| | | | | |
|---|---|---|---|---|
| WO | WO-2017211625 | A1 * | 12/2017 | ............. A61B 6/032 |
| WO | WO2017223343 | A1 | 12/2017 | |
| WO | WO2018011321 | A1 | 1/2018 | |

OTHER PUBLICATIONS

PCT International Search Report, International application No. PCT/EP2019/066570, Oct. 9, 2019.

Yu L. et al., "Dual-Energy CT-Based Monochromatic Imaging", American Journal of Roentgenology, vol. 199, No. 5_supplement, Nov. 2012 (Nov. 2012).

Lee S. et al., "Development of Virtual Monochromatic Imaging Technique with Spectral CT Based on a Photon-Counting Detector", Progress in Biomedical Optics and Imaging, SPIE—International Society for Optical Engineering, Bellingham, WA, US, vol. 10573, Mar. 9, 2018 (Mar. 9, 2018).

Alvarez R. et al. "Energy-selective Reconstructions in X-ray Computerized Tomography," Physics in Medicine and Biology, 1976, vol. 21, No. 5, pp. 733-744.

Giusseppe V.T. et al., "Dual energy CT in Body Imaging", Seminars in Roentgenology, vol. 53, Issue 2, Apr. 2018, pp. 132-146.

* cited by examiner

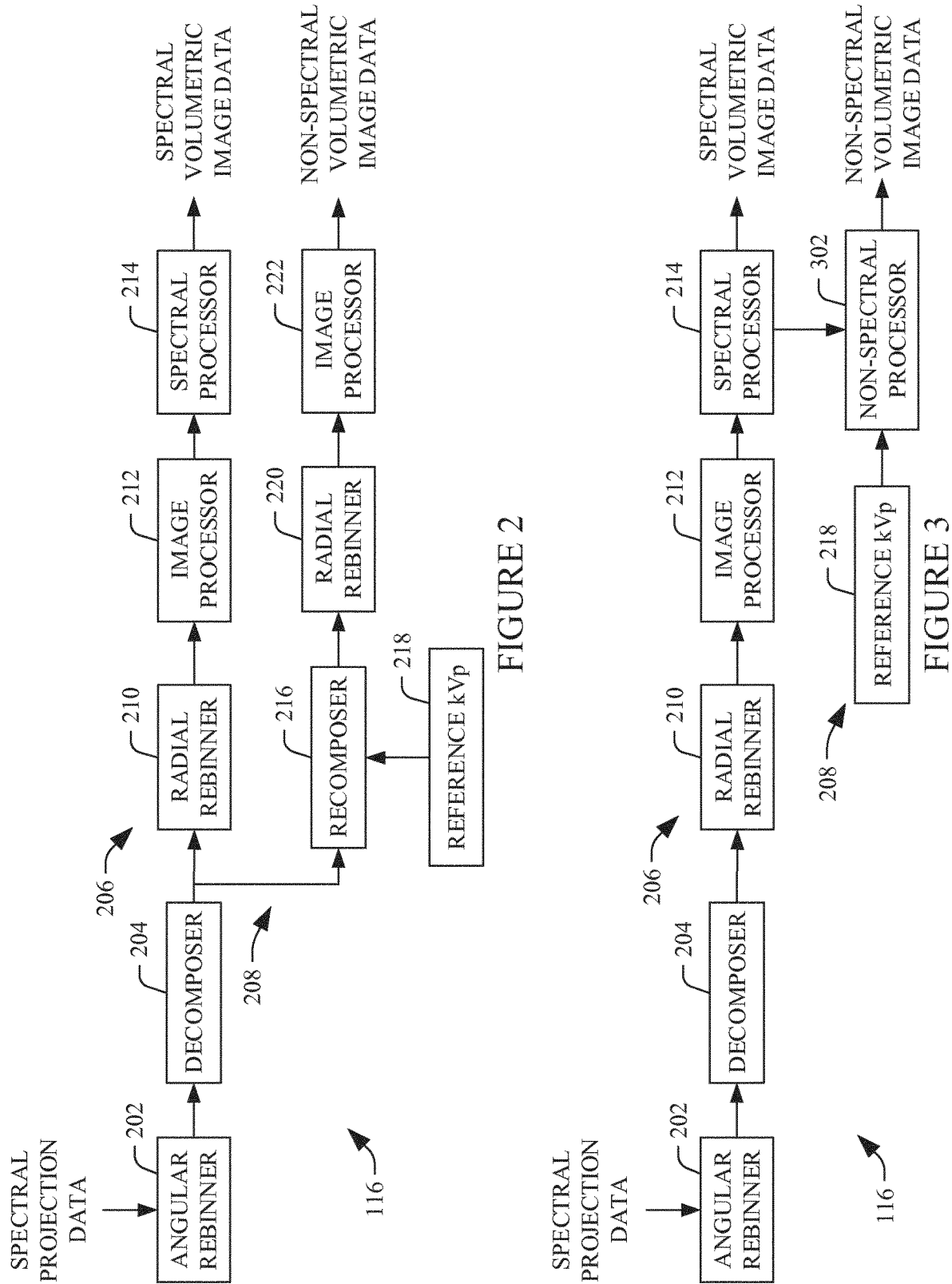

IMAGING SYSTEM CONFIGURED TO GENERATE NON-SPECTRAL VOLUMETRIC IMAGE DATA FROM A KVP SWITCHING MULTI-ENERGY ACQUISITION

FIELD OF THE INVENTION

The following generally relates to imaging and more particularly to an imaging system configured with kVp switching and to generate spectral volumetric image data and non-spectral volumetric image data from a kVp switching multi-energy acquisition and is described with particular application to computed tomography (CT).

BACKGROUND OF THE INVENTION

A non-spectral computed tomography (CT) scanner generally includes an x-ray tube mounted on a rotatable gantry opposite one or more rows of detectors. The x-ray tube rotates around an examination region located between the x-ray tube and the one or more rows of detectors and emits broadband radiation that traverses the examination region. For example, with a peak (maximum) tube voltage of 120 keV (i.e. 120 kVp), the energy spectrum of the emitted radiation (with filtering of low energy photons) may be from 40 keV to 120 keV. The one or more rows of detectors detect radiation that traverses the examination region and generate projection data (line integrals) indicative thereof. The projection data is reconstructed to generate volumetric image data.

The voxels of the reconstructed volumetric image data are displayed using gray scale values corresponding to relative radiodensity. The gray scale values reflect the attenuation characteristics of the scanned subject and generally show structure such as anatomical structures within the scanned subject. Since the attenuation of a photon by a material is dependent on the energy of the photon traversing the material, the detected radiation also includes spectral information, which provides additional information indicative of the elemental or material composition (e.g., atomic number) of the scanned material of the subject. However, the values of the projection data are proportional to the energy fluence integrated over the energy spectrum (e.g., 40 keV to 120 keV), and the volumetric image data does not reflect the energy dependent information.

A spectral (multi-energy) CT scanner is configured to generate projection data for different energy bands. In one instance, this is achieved through kVp switching. For example, with a dual-energy configuration, a first voltage (e.g., a lower kVp) is applied across the x-ray tube voltage for a first integration period, a second voltage (e.g., a higher kVp) is applied across the x-ray tube voltage for a second integration period, the first voltage is applied across the x-ray tube voltage for a third integration period, the second voltage is applied across the x-ray tube voltage for a fourth integration period, and so on. The lower and higher kV projection data is decomposed, e.g., into photoelectric effect and Compton scattering components, which are individually reconstructed and then combined to produce virtual monoenergetic volumetric image data.

A CT scanner configured as such and operated in kVp switching mode reconstructs virtual monoenergetic volumetric image data but generally does not reconstruct non-spectral volumetric image data. Unfortunately, the virtual monoenergetic volumetric image data does not include all the information reflected in non-spectral volumetric image data. For example, a virtual monoenergetic volumetric image data will not show the same soft-tissue contrast as non-spectral volumetric image data. However, radiologists have been trained to identify subtle soft-tissue contrast changes as pathologies using non-spectral volumetric image data. As a consequence, with virtual monoenergetic volumetric image data, it may be more difficult to find a soft-tissue contrast change due to a pathology and a pathology may be missed.

SUMMARY OF THE INVENTION

Aspects described herein address the above-referenced problems and others. In one aspect, a reconstruction system includes a decomposer configured to decompose at least two sets of projection data generated via kVp switching between at least two radiation source voltages. Each set corresponds to a different one of the at least two radiation source voltages. The system further includes a spectral channel configured to process the at least two sets of projection data and generate spectral image data. The system further includes a non-spectral channel configured to process the at least two sets of projection data and generate non-spectral image data for a predetermined reference kVp. The reference kVp might be predetermined by the user or from the system, e.g. by analysis of the scout scan.

In another aspect, a computer readable medium is encoded with computer executable instructions, which, when executed by a processor of a computer, cause the processor to: decompose at least two sets of projection data generated via kVp switching between at least two radiation source voltages, wherein each set corresponds to a different one of the at least two radiation source voltages, and process the at least two sets of projection data and generate non-spectral image data for a predetermined reference kVp. In another aspect, a method includes decomposing at least two sets of projection data generated via kVp switching between at least two radiation source voltages. Each set corresponds to a different one of the at least two radiation source voltages. The method further includes generating non-spectral image data for a predetermined reference kVp based on the at least two sets of projection data.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 2 schematically illustrates an example of the reconstructor of FIG. 1.

FIG. 3 schematically illustrates another example of the reconstructor of FIG. 1.

DETAILED DESCRIPTION OF EMBODIMENTS

The following describes an example imaging system configured for kVp switching and to generate spectral and non-spectral volumetric image data from a kVp switching multi-energy acquisition.

Figure 1:
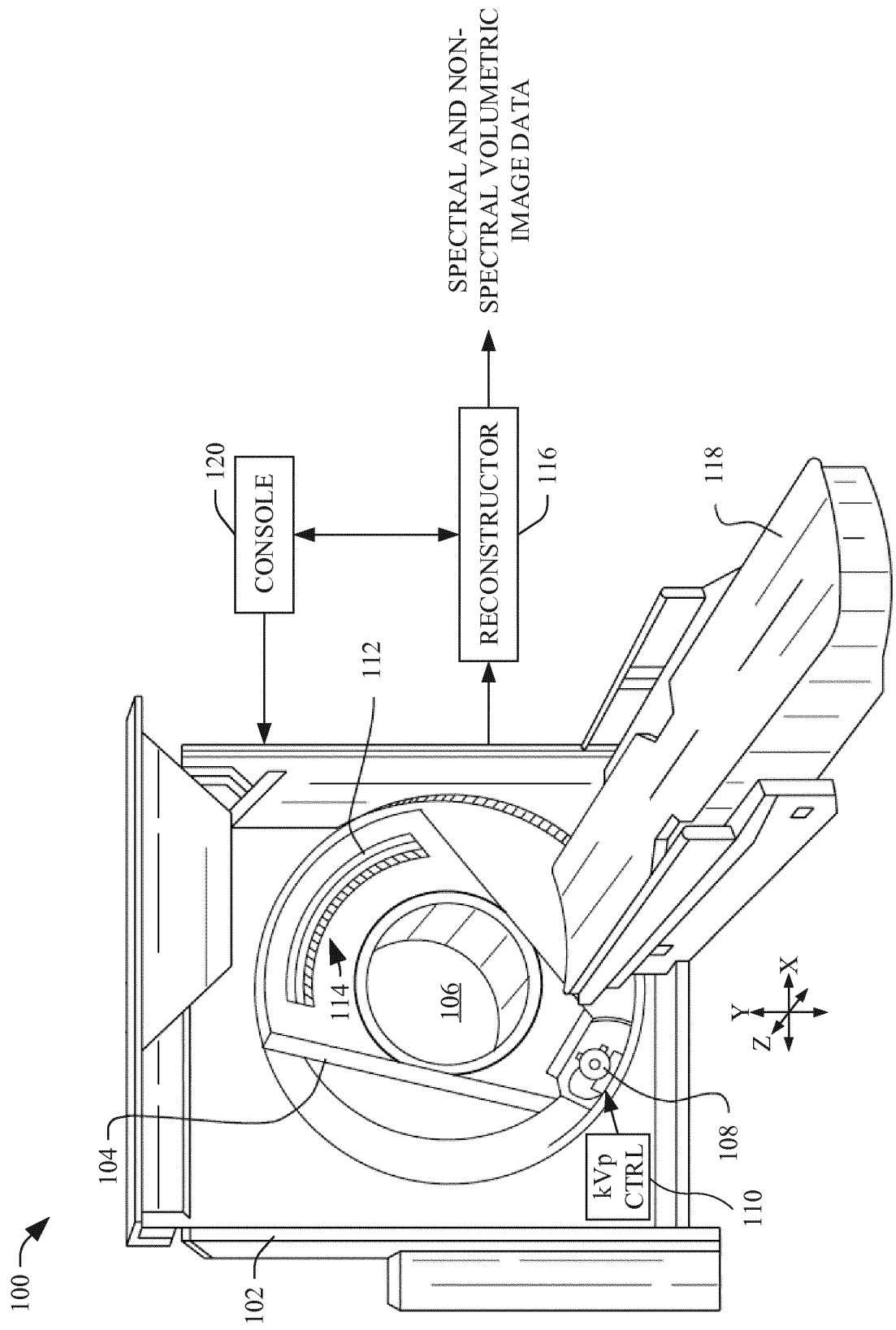
FIG. 1 schematically illustrates an example imaging system with a reconstructor configured for kVp switching and to generate spectral volumetric image data and non-spectral volumetric image data from a kVp switching multi-energy acquisition.

Initially referring to FIG. 1, an imaging system 100, such as a computed tomography (CT) scanner, is schematically illustrated. The imaging system 100 includes a generally stationary gantry 102 and a rotating gantry 104, which is rotatably supported by the stationary gantry 102 and rotates around an examination region 106 about a z-axis.

A radiation source 108, such as an x-ray tube, is rotatably supported by the rotating gantry 104, rotates with the rotating gantry 104, and emits broadband radiation that traverses the examination region 106. A radiation source voltage controller (kVp CTRL) 110 controls a peak emission voltage of the radiation source 108. The kVp CTRL 110 is configured to switch the x-ray tube voltage between at least two voltages (e.g., 80 kVp and 140 kVp, etc.). As a result, the radiation source 108 alternately produces at least a first radiation beam with a first energy spectrum and a second radiation beam with a second different energy spectrum.

A detector 112 includes a one- or two-dimensional array of detector elements 114, with each row extending in an xy plane, and multiple rows arranged along the z direction. The detector 112 is rotatably supported by the rotating gantry 104 along an angular arc opposite the radiation source 108 across the examination region 106. The detector 112 rotates in coordination with the radiation source 108, detects radiation that traverses the examination region 106, and generates different sets of projection data for each of the different energy spectrums.

In one instance, the kVp CTRL 110 alternates the x-ray tube voltage between integration periods (IPs). Generally, an IP is a period of time the detector 112 detects radiation while rotating through a predetermined angular increment for a measurement. For each IP, each detector element 114 produces a line integral. A set of line integrals for an IP/angular increment is a view. The projection data includes a set of views acquired over at least 180° plus a fan angle for each of the different energy spectrums. In the illustrated embodiment, the views for the different energy spectrums are interleaved.

A reconstructor 116 reconstructs the projection data for the different energy spectrums and generates volumetric image data. As described in greater detail below, this includes generating spectral volumetric image data and non-spectral volumetric image data from the projection data. Examples of spectral volumetric image data include low and high energy, mono-energetic/monochrome, virtual non-contrast, effective Z (atomic number), iodine only, and/or other spectral volumetric image data, etc. The non-spectral volumetric image data corresponds to a predetermined x-ray tube kVp.

In one instance, the reconstructor 116 is implemented with a processor (e.g., a central processing unit, a microprocessor, etc.) configured to execute computer executable instructions stored, embedded, encoded, etc. on computer readable storage medium (which excludes transitory medium), such as physical memory and/or other non-transitory memory. In some embodiments, the reconstructor 116 includes specialized hardware such as a graphics processing unit (GPU), an application specific integrated circuit (ASIC), etc. The reconstructor 116 is part of the system 100 as shown and/or remote therefrom.

A subject support 118, such as a couch, supports an object or subject in the examination region 106. The subject support 118 is movable in coordination with performing an imaging procedure so as to guide the subject or object with respect to the examination region 106 for loading, scanning, and/or unloading the subject or object.

An operator console 120 allows an operator to control an operation of the system 100 such as selecting a kVp switching imaging protocol, a reconstruction algorithm, etc. The operator console 120 includes an input device(s) such as a mouse, keyboard, etc. and an output device(s) such as a display monitor.

FIG. 2 schematically illustrates an example of the reconstructor 116. For explanatory purposes, this example is described in connection with a dual energy scan in which the voltage of the radiation source 108 is switched between two voltages (lower and higher) between views, and the detector 112 generates low and high kV projection data.

An angular rebinner 202 receives the sets of low and high kV spectral 20 projection data and angularly rebins them to produce sets of low and high kV parallel line integrals. In one non-limiting instance, this is achieved through a known or other angular rebinning approach. An example of a suitable approach is described in U.S. Pat. No. 6,963,631 B2, filed Oct. 25, 2002, and entitled "Dynamic Detector Interlacing for Computed Tomography," which is incorporated by reference in its entirety herein.

A decomposer 204 decomposes the sets of low and high kV parallel line integrals into different basis or contributions such as photo-electric effect and Compton scattering or other bases. A non-limiting approach includes creating a look-up table (LUT) with contribution of each basis as a function of energy, storing the LUT, and using the values in the LUT to decompose the line integrals into contributions of the two bases. An example of a suitable approach for creating and using the LUT for decomposition is described in U.S. Pat. No. 9,324,142 B2, filed Dec. 4, 2013, and entitled "Multi-energy imaging," which is incorporated by reference in its entirety herein.

Another approach models low and high kV parallel line integrals as: $I_{h,l} = \int S_{h,l}(E) D(E) \exp(-\int \mu(E) dl) dE$, where indices h,l refer to high and low, $S_{h,l}(E)$ is the tube spectrum for high and low, and $\exp(-\int \mu(E) dl) dE$ represents the line integrals. Dual energy processing separates $\int \mu(E) dl$ into basis components so that, e.g., $I_{h,l} = \int S_{h,l}(E) D(E) \exp(-L_{B1} B1(E) - L_{B2} B2(E)) dE$, where $L_{B1}$ and $L_{B2}$ are two basis pair contributions, D(E) represents the spectral response of the detector, and B1(E) and B2(E) are their corresponding energy dependencies of attenuation. The decomposition solves for each pixel a non-linear system that maps the two unknowns $L_{B1}$ and $L_{B1}$ to the measurements $I_h$, $I_l$.

Where the two basis pair contributions are photo-electric effect and Compton scattering contributions, $I_{h,l} = \int S_{h,l}(E) D(E) \exp(-L_p P(E) - L_s S(E)) dE$, where $L_p$ and $L_s$ are the photo-electric effect and Compton scattering contributions, and P(E) and S(E) are their corresponding energy dependencies of attenuation, and the decomposition solves for each pixel a non-linear system that maps the two unknowns $L_p$ and $L_s$ to the measurements $I_h$, $I_l$. Other basis pairs are also contemplated herein. Another example is described in Alverez, et al., "Energy-selective Reconstructions in X-ray Computerized Tomography," Phys. Med. Biol. 1976, Vol. 21, No. 5, 733-744. Other approaches are also contemplated herein.

The reconstructor 116 includes two processing chains, 206 and 208, which process both contributions. The processing (spectral) chain 206 processes the contributions and generates spectral volumetric image data. The processing (non-spectral) chain 208 processes the contributions and generates non-spectral volumetric image data.

The processing chain 206 includes a radial rebinner 210 that receives the two contributions and radially rebins (e.g., through interpolation) the parallel line integrals to produce equally spaced parallel line integrals. In one non-limiting instance, this is achieved through a known or other angular rebinning approach. An example of a suitable approach is described in U.S. Pat. No. 6,963,631 B2.

The processing chain 206 further includes an image processor 212 that reconstructs the radially rebinned decomposed projection data, producing first and second volumetric image data for the first and second contributions. The image processor 212 employs a filtered back-projection, iterative, and/or other reconstruction approach.

The processing chain 206 further includes a spectral processor 214 that combines (e.g., a weighted summation) the first and second volumetric image data to produce spectral volumetric image data. For example, the image processor 212 can produce mono-energetic volumetric image data mage. As described herein, other spectral volumetric image data includes virtual non-contrast, effective Z, iodine only, etc. spectral volumetric image data.

The processing chain 208 includes a recomposer 216 that recomposes the decomposed projection data for a predetermined reference kVp 218. The predetermined reference kVp 218 is a default, user specified, programmable, etc. reference voltage. An example recomposition is: $I_{reference\_kVp} = \int D(E) S_{reference\_kVp}(E) \exp(-L_p P(E) - L_s S(E)) dE$. For example, where the low and high kVp's are 80 kVp and 140 kVp and the reference kVp 218 is 120 kVp, the recomposition is: $I_{120\_kVp} = \int D(E) S_{120\_kVp}(E) \exp(-L_p P(E) - L_s S(E)) dE$. In one instance, this is implemented by multiplying the attenuation of a material at a particular energy by the portion of the energy spectrum at that particular energy for the reference kVp 218, for all energies of the energy spectrum, and then summing the products.

The processing chain 208 further includes a radial rebinner 220 that receives the recomposed projection data and radially rebins the parallel line integrals to produce equally spaced parallel line integrals, e.g., as discussed in connection with the radial rebinner 210. In one instance, the radial rebinners 210 and 220 are separate radial rebinners, as shown. In a variation, the radial rebinners 210 and 220 are part of a same radial rebinner or are the same radial rebinner.

The processing chain 208 further includes an image processor 222 that receives the radially rebinned recomposed projection data and reconstructs the data, e.g., as discussed in connection with the image processor 212. In one instance, the image processors 212 and 222 are separate image processors, as shown. In a variation, the image processors 212 and 222 are part of a same image processor or are the same image processor.

Generally, the processing chain 208 processes interleaved acquisitions taken at different source spectrums and generates non-spectral volumetric image data that looks like non-spectral volumetric image data reconstructed with projection data from a particular kVp acquisition. By way of example, in one non-limiting instance the processing chain 208 processes 80 kVp and 140 kVp interleaved acquisitions and generates volumetric image data that looks like non-spectral volumetric image data reconstructed with projection data from a single 120 kVp acquisition.

FIG. 3 schematically illustrates another example of the reconstructor 116. This example includes the angular rebinner 202, the decomposer 204, the first chain 206 (the radial rebinner 210, and the image processor 212, and the spectral processor 214). These components are discussed above, and the discussion in not repeated here. In this example, the spectral processor 214 generates mono-energetic images across an energy spectrum of the radiation beam, e.g., from 40 keV to 120 keV.

In this example, the channel 208 includes the reference kVp 218 (described above) and a non-spectral processor 302. The non-spectral processor 302 generates non-spectral volumetric image data by calculating a weighted average of mono-energetic images across the radiation beam energy spectrum (e.g., from 40 keV to 120 keV), where the relative weight is derived from the effective tube spectrum at the reference kVp (e.g., 120 kVp) filtered by the subject or an average subject. This weighting will mimic the contrast shown in non-spectral volumetric image data.

Figure 4:
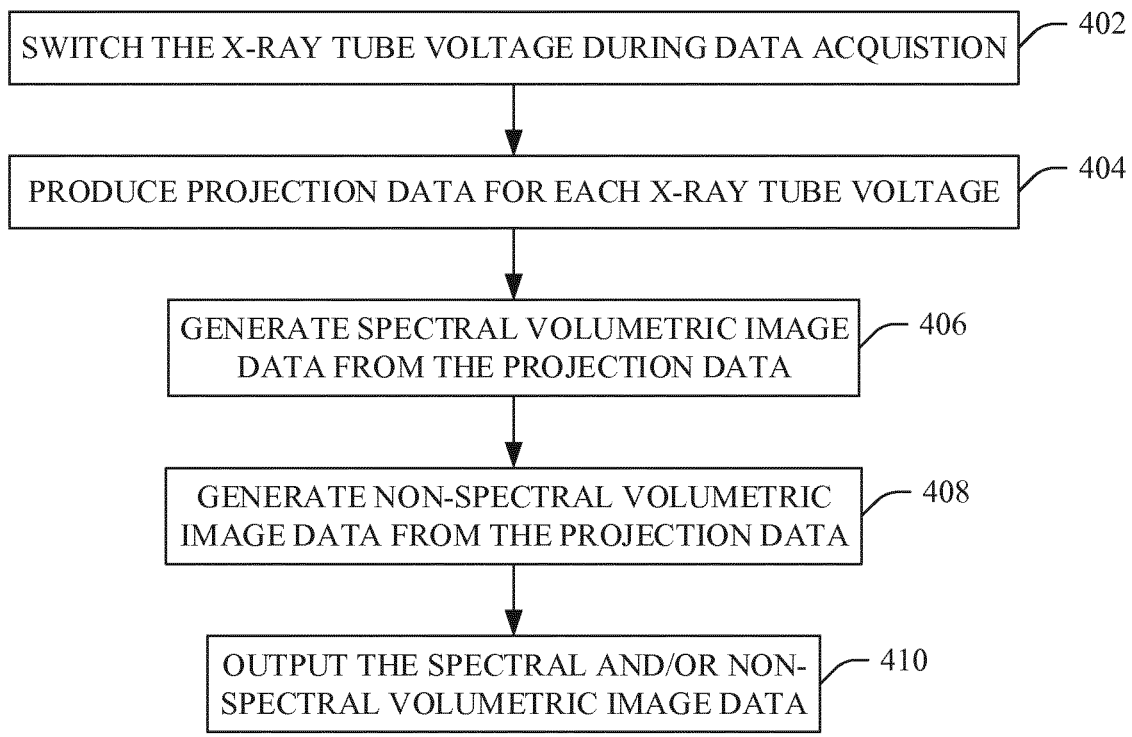
FIG. 4 illustrates an example method in accordance with an embodiment(s) described herein.

FIG. 4 illustrates an example method in accordance with an embodiment(s) described herein. It is to be appreciated that the ordering of the below acts is not limiting, and other ordering is contemplated herein, such as other serial processing and/or parallel processing.

At 402, a voltage of the radiation source 108 is switched, via the kVp CTRL 110, between at least two different voltages while rotating the radiation source 108 around the examination region 106 for a CT scan.

At 404, the detector 112 separately detects radiation for each of the at least two different x-ray tube voltages and produces first projection data for a first of the two voltages and second projection data for a second of the two voltages.

At 406, the processing chain 206 processes the first and second projection data to generate spectral volumetric image data, as described herein and/or otherwise.

At 408, the processing chain 208 processes the first and second projection data to generate non-spectral volumetric image data, as described herein and/or otherwise.

At 410, the spectral volumetric image data and/or non-spectral volumetric image data is output, e.g., displayed, saved, conveyed to another device, etc.

Figure 5:
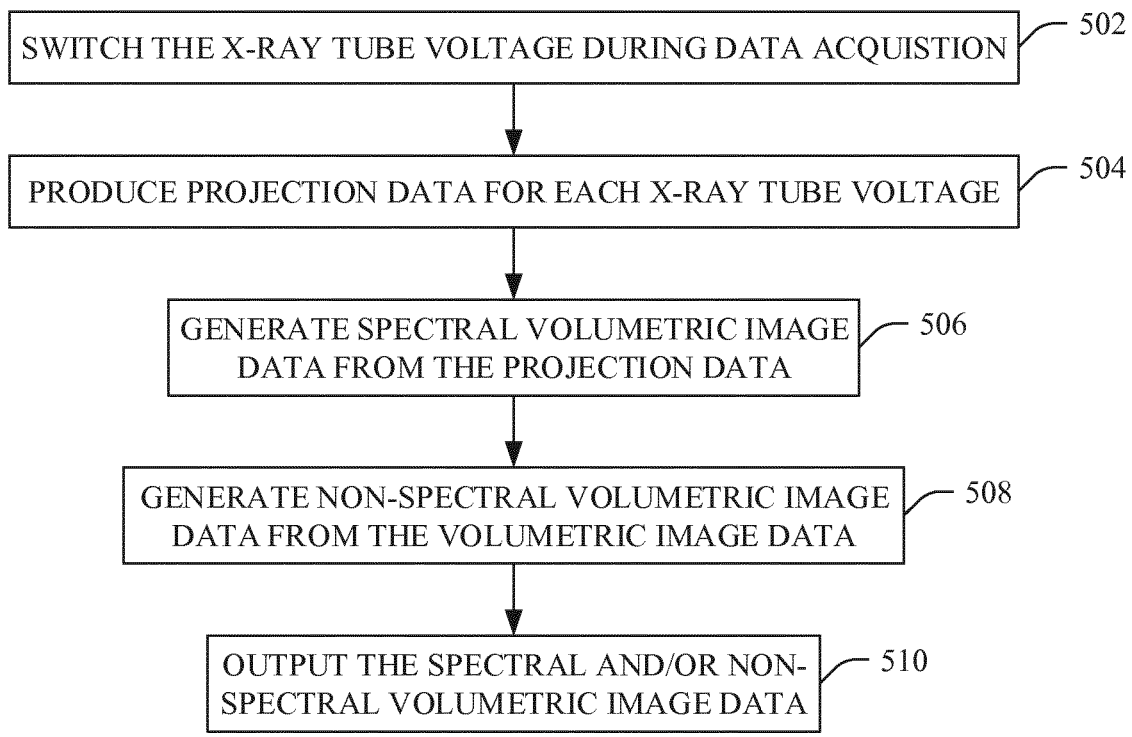
FIG. 5 illustrates another example method in accordance with an embodiment(s) described herein.

FIG. 5 illustrates another example method in accordance with an embodiment(s) described herein.

At 502, a voltage of the radiation source 108 is switched, via the kVp CTRL 110, between at least two different voltages while rotating the radiation source 108 around the examination region 106 for a CT scan.

At 504, the detector 112 separately detects radiation for each of the at least two different x-ray tube voltages and produces first projection data for a first of the two voltages and second projection data for a second of the two voltages.

At 506, the processing chain 206 processes the first and second projection data and generates spectral volumetric image data, as described herein and/or otherwise.

At 508, the spectral volumetric image data are processed to generate non-spectral volumetric image data, as described herein and/or otherwise.

At 510, the spectral volumetric image data and/or non-spectral volumetric image data is output, e.g., displayed, saved, conveyed to another device, etc.

The above may be implemented by way of computer readable instructions, encoded or embedded on computer readable storage medium (which excludes transitory medium), which, when executed by a computer processor(s) (e.g., central processing unit (CPU), microprocessor, etc. cause the processor(s) to carry out acts described herein. Additionally, or alternatively, at least one of the computer readable instructions is carried by a signal, carrier wave or other transitory medium, which is not computer readable storage medium.

Figure 6:
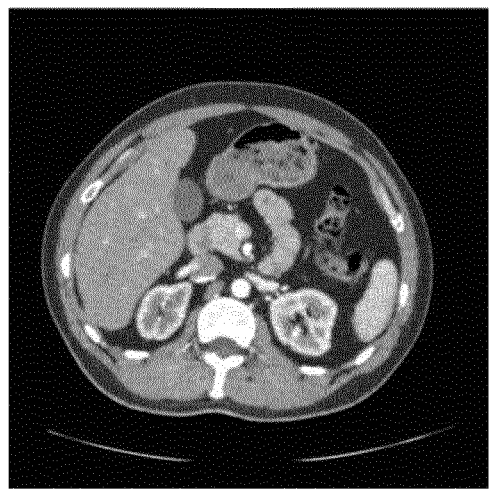
FIG. 6 illustrates an example virtual mono-energetic image.
Figure 7:
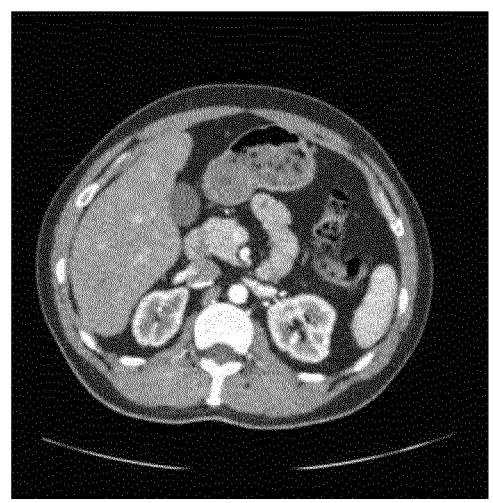
FIG. 7 illustrates an example kVp image generated as described herein.
Figure 8:
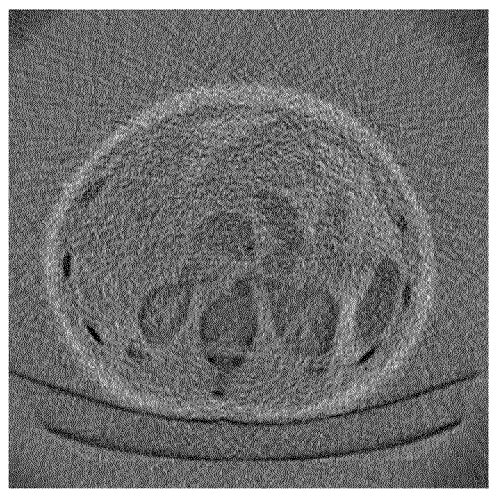
FIG. 8 illustrates a difference between the example virtual mono-energetic image of FIG. 6 and the kVp image of FIG. 7.

FIGS. 6-8 show that a mono-energetic image reflects different contrast than a non-spectral image. FIG. 6 shows a mono-energetic image, FIG. 7 shows a kVp non-spectral image generated using the approached described herein, and FIG. 8 shows a difference image therebetween. The difference image of FIG. 8 represents the contrast difference between the mono-energetic image of FIG. 6 and the non-spectral image of FIG. 7.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An imaging system for generating non-spectral volumetric image data from a kVp switching multi-energy acquisition, comprising:
    a decomposer configured to decompose at least two sets of projection data generated via kVp switching between at least two radiation source voltages, wherein each set corresponds to a different one of the at least two radiation source voltages;
    a spectral channel configured to process the at least two sets of projection data to generate spectral image data; and
    a non-spectral channel configured to process the at least two sets of projection data to generate non-spectral image data for a predetermined reference kVp, wherein the non-spectral channel comprises a recomposer configured to recompose the at least two sets of projection data for the predetermined reference kVp by multiplying an attenuation at a particular energy by a portion of an energy spectrum at the reference kVp, for all energies of the energy spectrum, and by summing the products.

2. The imaging system of claim 1, wherein the non-spectral channel further comprises:
    a radial rebinner configured to rebin the recomposed projection data; and
    an image processor configured to reconstruct the rebinned projection data to generate the non-spectral image data.

3. The imaging system of claim 1, wherein the recomposer is configured to recompose the at least two sets of projection data using: $I_{reference\_kVp} = \int D(E) \, S_{reference\_kVp}(E) \exp(-L_p P(E) - L_s S(E)) dE$, where $I_{reference\_kVp}$ represents intensity measurements at the reference kVp, $S_{reference\_kvp}$ represents an energy spectrum of the radiation source at the reference kVp, $L_p$ represents a photo-electric effect contribution, $L_s$ represents a Compton scattering contribution, $D(E)$ represents a spectral response of the detector, $P(E)$ represents an energy dependency of attenuation of the photo-electric effect contribution, and $S(E)$ represents an energy dependency of attenuation of the Compton scattering.

4. The imaging system of claim 1, wherein the spectral channel further comprises:
    a radial rebinner configured to rebin the decomposed projection data;
    an image processor configured to reconstruct the rebinned projection data to generate the spectral basis image data; and
    a spectral processor configured to process spectral basis image data to generate spectral volumetric image data.

5. The imaging system of claim 1, wherein the predetermined reference kVp is a default value.

6. The imaging system of claim 1, wherein the predetermined reference kVp is a user defined value.

7. A non-transitory computer readable medium having executable instructions stored thereon, where the executable instructions, when executed by at least one processor, cause the at least one processor to perform a method for generating non-spectral volumetric image data from a kVp switching multi-energy acquisition, the method comprising:
    decomposing at least two sets of projection data generated via kVp switching between at least two radiation source voltages, wherein each set corresponds to a different one of the at least two radiation source voltages;
    processing the at least two sets of projection data to generate spectral image data;
    recomposing the at least two sets of projection data for a predetermined reference kVp by multiplying an attenuation at a particular energy by a portion of an energy spectrum at the reference kVp, for all energies of the energy spectrum, and by summing the products;
    generating non-spectral image data for the predetermined reference kVp based on the recomposed at least two sets of projection data.

8. A method for generating non-spectral volumetric image data from a kVp switching multi-energy acquisition, comprising:
    decomposing at least two sets of projection data generated via kVp switching between at least two radiation source voltages, wherein each set corresponds to a different one of the at least two radiation source voltages;
    processing the at least two sets of projection data to generate spectral image data;
    recomposing the at least two sets of projection data for a predetermined reference kVp by multiplying an attenuation at a particular energy by a portion of an energy spectrum at the reference kVp, for all energies of the energy spectrum, and by summing the products;
    generating non-spectral image data for the predetermined reference kVp based on the recomposed at least two sets of projection data.

* * * * *